Figure 1:
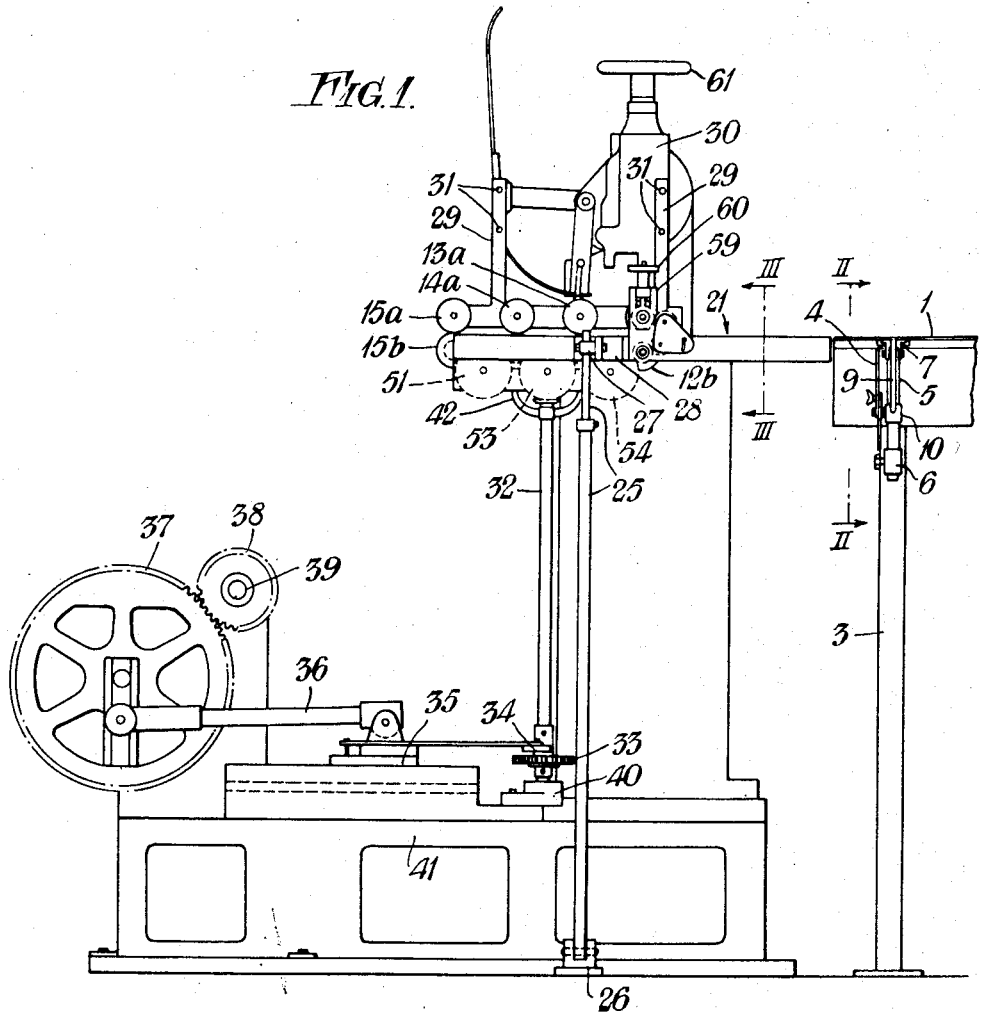

Aug. 11, 1953     W. J. CUTHBERT     2,648,064
IMPROVEMENTS IN WIRE-STAPLING MACHINE

Filed Dec. 24, 1951     3 Sheets—Sheet 1

Aug. 11, 1953 W. J. CUTHBERT 2,648,064
IMPROVEMENTS IN WIRE-STAPLING MACHINE
Filed Dec. 24, 1951 3 Sheets-Sheet 2

INVENTOR
WILLIAM JAMES CUTHBERT
By:
Haseltine, Lake & Co.
AGENTS

Aug. 11, 1953     W. J. CUTHBERT     2,648,064
IMPROVEMENTS IN WIRE-STAPLING MACHINE
Filed Dec. 24, 1951     3 Sheets-Sheet 3

INVENTOR
WILLIAM JAMES CUTHBERT
By Haseltine, Lake & Co.
AGENTS

Patented Aug. 11, 1953

2,648,064

UNITED STATES PATENT OFFICE 2,648,064

IMPROVEMENTS IN WIRE-STAPLING MACHINE

William James Cuthbert, Enfield, England, assignor of one-half to British Brehmer Limited, Enfield, England, a British company Application December 24, 1951, Serial No. 263,067
In Great Britain January 1, 1951

3 Claims. (Cl. 1—7)

This invention relates to wire-stapling or stitching machines for use in the production of books, periodicals and the like, the machines being of the kind in which groups of loose sheets are passed, one after another, along a work-supporting way or table and under a stitcher head arranged near, or towards, the delivery end of the table. The loose sheets may be collected in the required groups in known manner whilst being fed along the table from the feed end of the latter to a position just short of the stitcher head by an endless conveyor, or previously collected groups which are ready for stitching may be fed directly to such a position by hand. Stitcher feed members are arranged to displace the groups of loose sheets further along the table from the aforesaid pre-stitching position and first to locate the said groups in turn under the stitcher head for the application of the stitches or staples, and then to displace the stitched groups from under the stitcher head towards a delivery point at or near the delivery end of the machine, the functioning of the conveyor, stitcher feed members and stitcher head being suitably synchronised to permit a continuous operation.

A main object of the present invention is to provide improvements in the construction of such machines.

According to the present invention, there is provided a stapling or stitching machine of the kind specified wherein the stitcher feed means includes at least one pair of co-operating superposed feed rollers adapted to be driven intermittently, the said rollers being so arranged that each unstitched group of loose sheets which arrives at or near the stitcher head can enter directly between said rollers and thereafter is positioned under the stitcher head for the application of stitches or staples and subsequently displaced towards the delivery point by the said rollers. A number of additional pairs of superposed co-operating rollers, each pair having at least one intermittently driven roller, are preferably arranged in spaced series behind said first-mentioned roller pair, the roller pairs of the series being positioned so that the aforesaid groups will pass therethrough towards the delivery point, and the spacing between the roller pairs being such that a group will enter between a following pair of rollers before it has completely left the preceding roller pair. At least the first pair of rollers are preferably made of a flexible rubber-like material or are provided with an outer covering of such material.

The stitcher feed rollers according to the invention can conveniently be utilized in combination with a work-supporting table or way including at least one elongated panel or supporting surface arranged for angular adjustment, about an axis which is substantially parallel to the feed path of the groups and which passes under the stitching head, to provide, in conjunction with a dependent flange along the rear edge of the panel, an inverted V-shaped supporting surface for carrying out "saddle work", or a substantially horizontal surface, for carrying out "pad work", the aforesaid feed rollers being arranged for adjustment to correspond with the position of adjustment of the work-supporting table.

Figure 2:
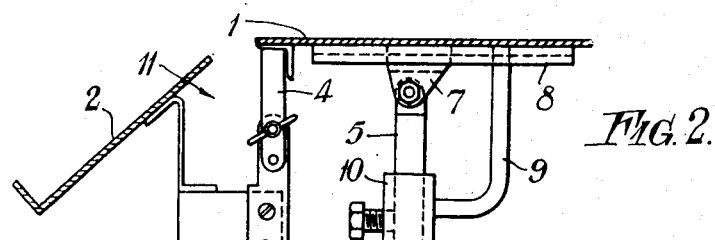
Figure 3:
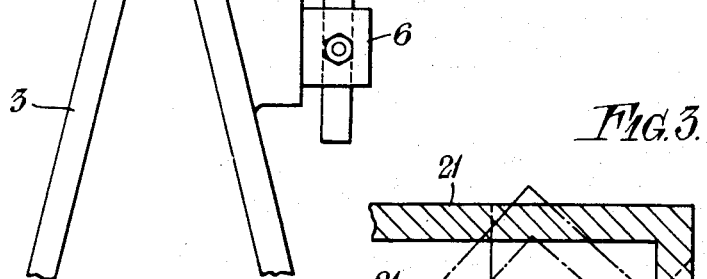
Figure 4:
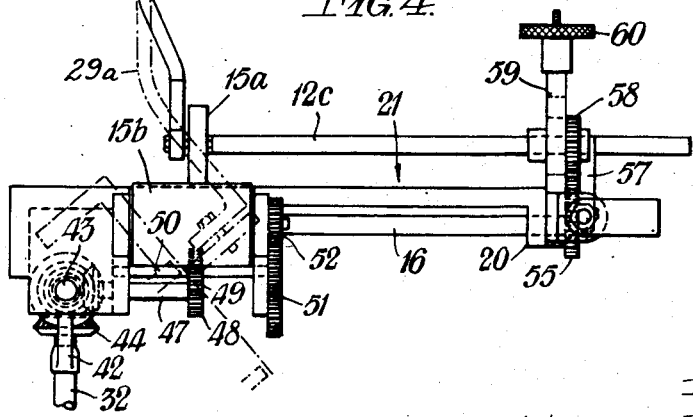
Figure 5:
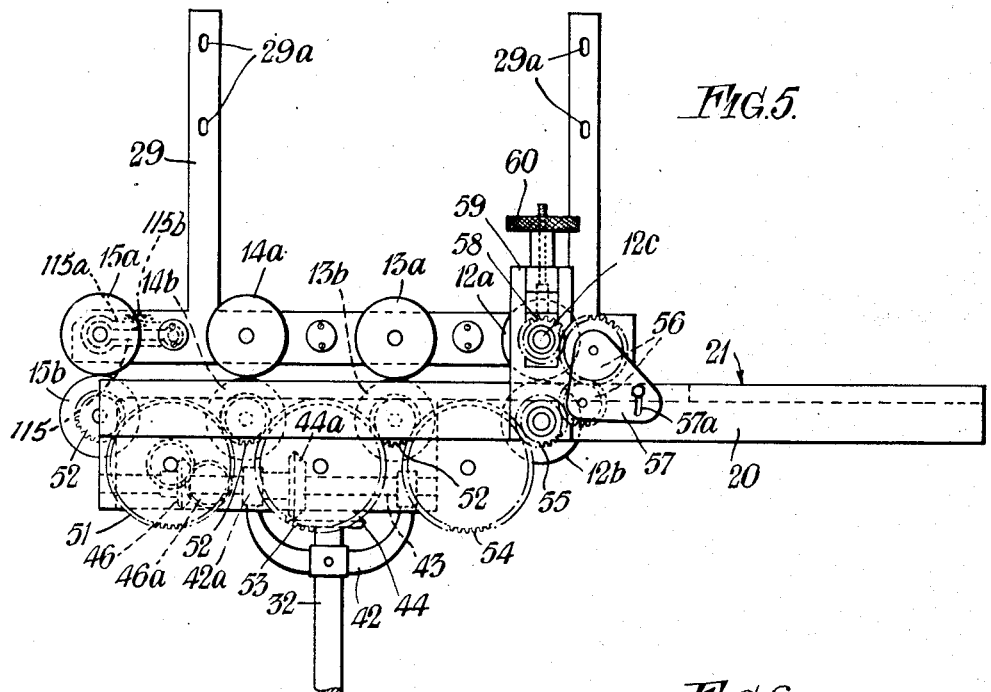
Figure 6:
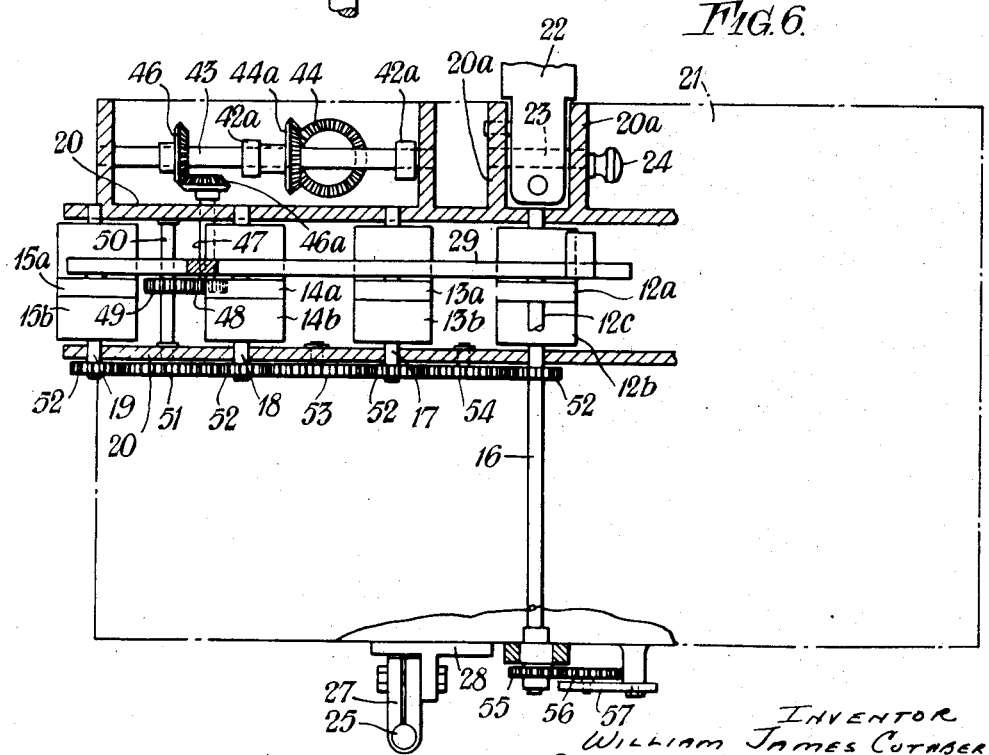

In order that the invention may be clearly understood and readily carried into effect one embodiment thereof will now be indicated in detail with reference to the accompanying drawings, wherein:

Figure 1 is a front elevation showing the relevant parts of a stapling or stitching machine constructed in accordance with the invention, part of the work-supporting table being broken away, Figure 2 is a section to an enlarged scale and partially broken away on the line II—II of Figure 1, Figure 3 is a detail section to a larger scale than Figure 2 and taken on the line III—III of Figure 1, Figure 4 is an end elevation on the same scale as Figure 2 and showing part of the supporting table with associated stitcher feed rollers and driving mechanism, Figure 5 is a front elevation of the mechanism shown in Figure 4, and Figure 6 is a part-sectional plan view of the mechanism shown in Figures 4 and 5, the adjacent portion of the work-supporting table being shown in chain-dotted lines.

Referring now to the drawings, the work-supporting table in this example is formed in two parts. One part provides an elongated delivery or feed conveyor way along which groups of loose sheets are delivered to the other part, which latter extends under the stitching head and provides a stitcher conveyor way for the groups during the application of the stitches or staples. The two table parts are normally arranged in prolongation one of the other so that the delivery of the groups from the feed way on to the stitcher way takes place without interruption of the feed.

The part of the supporting table which provides the feed way includes two main elongated substantially rectangular panels 1 and 2 which are mounted, each with one straight side edge parallel to, and adjacent, a side edge of the other, on trestles 3. The trestles extend at intervals along the length of the feed way. The panel 1, which constitutes the front panel of the delivery part of the table, is supported, along the straight edge located adjacent the panel 2, on arms 4 which are hingedly carried on the respective trestles 3. The panel 1 can thus be angularly displaced on its support arms the hinge axis of which is parallel to the feed path of the groups loose sheets to be stitched, and extends under the stitcher head. The panel 1 is supported near its side edge which is remote from the hinge by means of support arms 5. These arms are adjustably carried in apertured lugs 6 on the respective trestles 3 and each is pivotally attached to a sliding member 7 which engages an appropriately positioned slide 8 on the under surface of the panel 1. To increase rigidity, each arm 5 has an L-shaped arm 9 adjustably mounted thereon by means of a collar 10 at one end of the arm 9, whilst the other end of the arm engages the associated slide 8. By suitable adjustment of these support arms, the panel 1 can thus be adjusted angularly from the substantially horizontal position as shown, in which "pad work" can be carried out, to a position in which it is downwardly inclined and lies substantially at right angles to the rear panel 2 for the purpose of carrying out "saddle work."

The rear panel 2 is mounted in a fixed angular position on the trestles 3, as shown, this panel being inclined downwardly from the adjacent straight side edge of the panel 1. An endless conveyor chain of known design, and not shown in the accompanying drawings, is arranged to run in the space 11 beneath the adjacent side edges of the panels 1 and 2, this chain being provided, in known manner, with flights which are pivotally mounted thereon and arranged to project from the upper chain run through the elongated slot between the panels 1 and 2 for the purpose of pushing or feeding the sheets to be stitched or stapled along the feed way and on to the stitcher way.

On delivery of the groups to the stitcher way, their feed is taken over by feed rollers which serves to position the groups in turn under the stitcher head and then to displace each stitched or stapled group from under the stitcher head towards the delivery end of the machine. The feed rollers, in this example, includes four pairs of superposed cooperating rollers 12a, 12b, 13a, 13b, 14a, 14b and 15a, 15b. These rollers are arranged in series, one pair behind the other. The bottom rollers 12b, 13b, 14b and 15b of the roller pairs are mounted respectively one on each of four parallel bottom roller shafts, 16, 17, 18 and 19, the latter being supported in bearings carried in dependent web portions 20 on the under surface of a support panel 21 which forms part of the stitcher way.

This panel 21 is normally arranged co-planar with, and in prolongation of, the front panel 1 of the feed way. The panel 21, which may have a dependent flange 21a along its rear edge, is conveniently hinged on to a fixed part 22 of the stitching machine body, the part 22 entering between two spaced web parts 20a dependent from the under surface of the panel 21, and being hinged thereto by means of a transverse hinge pin 23 arranged co-axially with the hinge axis of panel 1. The angular position of adjustment of the panel 21 in relation to the machine body is determined by a further transverse pin 24 which can be inserted as shown through concentric apertures 24 in the web plates 20a and in the machine body part 22. To ensure that the panel 21 will be rigid, the edge thereof remote from the hinge is supported by a telescoping rod mechanism 25, the lower end of which is pivotally attached to the base of the machine as at 26 and the upper end of which is adjustably and pivotally secured by a coupling 27 to a lug 28 on the panel 21.

The bottom roller shafts 16, 17, 18 and 19 are arranged in parallel relationship, one behind the other, underneath the panel 21 and extend substantially at right angles to the hinge axis. These shafts, together with their associated rollers 12b, 13b, 14b and 15b are thus angularly displaceable with the panel 21. The shaft axis 16 of the bottom roller of the leading roller pair is located substantially in the vertical plane through the stitcher head as can be seen in Figure 1. The axial length of each bottom roller is approximately equal, in this example, to one-quarter of the width of the panel 21. Immediately above each bottom roller the panel is provided with a slot extending parallel to the roller axis, the arrangement being such that a small axial segment of each bottom roller projects through a corresponding slot in the panel 21 so as to lie slightly above of the upper surface of the panel.

The four top rollers 12a, 13a, 14a and 15a each has an axial length which is approximately one-fifth of that of the corresponding bottom roller and these top rollers are arranged on a bracket 29 attached to the stitcher head, represented in outline at 30, so that each top roller lies immediately above its co-operating bottom roller. The bracket 29 is attached to the stitcher head 30 by means of bolts 31 which extend through elongated slots 29a in the bracket, whereby provision is made for slight vertical adjustment of the bracket in relation to the stitcher head.

The leading top roller 12a is arranged to be driven, as will be hereinafter explained in more detail, and the three following top rollers 13a, 14a and 15a are arranged to idle, and are each carried on the bracket 29 by means of a spring-influenced pivotally mounted arm, whereby the idler rollers are permitted a slight independent vertical movement, against spring influence, to allow for the passage therethrough of the groups of sheets. A diagrammatic representation of one such arm is shown at 115 in Figure 5 of the drawings. The arm is seated in a recess 115a in the bracket 29 and is influenced by a spring 115b which bears between the top of the arm and the upper recess wall. The arm 115 carries the roller 15a at one end and is pivoted to the bracket 29 at the opposite end. The rollers of the leading pair 12a, 12b are made of, or covered with, rubber or some other similar flexible material whilst the rollers constituting the following three roller pairs may be made of the same materal as the leading roller pair or of some other flexible or non-flexible material.

When the panel 21 is arranged in a substantially horizontal plane as shown in the drawings for carrying out "pad work," the bracket 29 supporting the top rollers is shaped as shown so that these rollers are each located with their axes substantially parallel to the axes of the bottom rollers, each top roller being positioned approximately in the centre, in the axial direction, of its corresponding bottom roller. When, however, the panel 21 is lowered to the position shown in chain-dotted lines in Figure 3 or Figure 4 for "saddle work," the bracket 29 carrying the top rollers is conveniently exchanged for another angle bracket such as bracket 29a which is shown in chain-dotted lines in Figure 4, so that the axes of the top rollers remain parallel to the axes of the bottom rollers, whilst each top roller is positioned adjacent the upper or inner end, in the axial direction, of its corresponding bottom roller.

Each of the four bottom rollers 12b, 13b, 14b and 15b and the leading top roller 12a, is arranged to be driven intermittently. The drive is transmitted to the rollers through a vertical shaft 32 having a toothed ratchet wheel 33 keyed on its lower end, which wheel is arranged for intermittent rotation, in known manner, by means of a co-operating pawl mechanism 34. The pawl mechanism is reciprocated through a slide 35 by a connecting rod 36 eccentrically mounted on a driven toothed wheel 37. The drive to the wheel 37 is transmitted through the pinion 38 which is keyed on a driven shaft 39 of the machine. The shaft 32 is positioned at the lower end in a bearing 40 on the machine frame 41 and, at the upper end, is positioned by a stirrup member 42 provided with spaced bearing arms having loops 42a at their outer ends engaging over a shaft 43, which is coaxial with the hinge axis of the supporting table.

From the upper end of the vertical shaft 32 the drive is transmitted through bevel gears 44, 44a to the shaft 43 which is rotatable in bearings carried by a part of the dependent web 20 and in relation to the loops 42a. From the shaft 43 the drive is transmitted through a further pair of bevel gears 46, 46a to a stub shaft 47 which is also mounted in bearings in the dependent web 20 and carries a gear wheel 48 at one end. This wheel 48 meshes with a further gear wheel 49 keyed on a lay shaft 50 which again is mounted in bearings in the dependent web 20. On the outer end of the lay shaft 50 there is keyed a further gear wheel 51 which is arranged between, and in driving engagement with, two gear wheels 52 keyed one on each of the last two bottom roller shafts 18 and 19 of the series. A second gear wheel 53 is driven by the gear wheel 52 on the shaft 18 and this second gear wheel 53 in turn meshes with and drives a gear wheel 52 which is keyed on the shaft 17 of the second bottom roller of the series. Again the drive is transmitted from the gear wheel 52 on the shaft 17 by a third gear wheel 54 which also meshes with a gear wheel 52 keyed on the shaft 16 of the leading bottom roller. The driven shaft 16 is extended towards the front or free edge of the panel 21 as shown, and carries a keyed gear wheel 55 at its outer end. From the gear wheel 55 a drive is transmitted through a pair of meshing gear wheels 56, carried on a pivotally mounted plate 57, to a gear wheel 58 keyed on a top shaft 12c which extends above the panel 21 parallel to the bottom roller shaft 16 and carries and drives the leading top roller 12a. This shaft 12c is resiliently supported at its inner end on the bracket 29 and, at its outer end, by a bearing 59 attached to the panel 21. The outer end of the shaft 12c is arranged for vertical adjustment in the bearing 59 by means of a hand screw 60 whereby the shaft 12c can be maintained parallel to the bottom roller shaft 16 when the bracket 29 is raised or lowered.

The plate 57 carrying the meshing gear wheels 56 is of triangular shape and is provided with an elongated slot 57a at the hinge connection whereby the drive from the bottom shaft 16 to the top shaft 12c can be maintained irrespective of the position of vertical adjustment of the latter shaft. To allow for varying thicknesses of work, the top rollers can be adjusted vertically by raising or lowering the stitcher head by means of the hand wheel 61 provided in the normal manner, and similarly the outer end of the shaft 12c can be correspondingly adjusted by the hand wheel 60 as aforesaid.

The amount of rotation imparted to the driven rollers at each stroke of the driving mechanism can readily be adjusted, for the purpose of controlling the spacing between staples, by varying the stroke length of the pawl and ratchet mechanism in known manner.

In operation, assuming that it is desired to carry out "sadle work," the panel 1 of the feed way is lowered to a position in which it lies approximately at an angle of some 90° to the panel 2 and the panel 21 is similarly adjusted to the chain-dotted position shown in Figure 3, so that the panel 21 lies in substantially co-planar relationship with the panel 1. The top rollers of the roller series are attached in their correct working positions as aforesaid by means of an appropriate bracket, and the top rollers are then vertically adjusted as necessary to allow for the thickness of the groups to be stapled. The pawl and ratchet mechanism is also adjusted to ensure that the groups will be moved forward the required distance at each step to allow the staples to be correctly positioned and spaced therein. The work can then be fed along the table as the loose sheets are collected together and stitched in the normal manner as for "saddle work," or, of course, collected groups could be fed on to the stitcher way adjacent the stitcher head so as to pass directly thereunder for stitching purposes.

If now it is desired to convert the machine to "pad work" this can be effected by a few very simple adjustments. The brackets supporting the upper rollers is replaced by the appropriate "pad work" bracket and the angularly adjustable panels 1 and 21 of the support table are then pivoted up into a horizontal position for the reception of the work. Any other necessary adjustments to the roller spacing or stroke lengths are made and the "pad work" can proceed in the normal manner. It will be appreciated that the gear train transmitting the drive from the vertical shaft 32 to the rollers is such as to permit the angular adjustment of the panel 21 whilst remaining in mesh.

The mechanism as described is applicable for most types of "pad" and "saddle work" and also has the advantage of being able to handle work of a spongy nature. Furthermore, the ease of adjustment both for stitch spacing and work of varying thickness is of great operational importance. Finally it may be mentioned that the resilient surface which is presented to the work at least by the leading roller pair ensures that the sheets in a group are maintained evenly one above the other during stitching and do not tend to fan forward or otherwise become relatively displaced.

As will be appreciated, the supporting table may take various forms to suit the work to be performed.

I claim:
1. In a wire-stapling machine for attaching loose sheets in the production of books, periodicals and the like, the combination of a stitcher head for applying staples to said sheets, an angularly adjustable conveyor way for supporting said sheets whilst the latter are fed through a stitching position for the application of said staples, a pair of co-operating feed members arranged to grip said sheets on the side of the stitch line remote from said stitcher head, for the purpose of feeding said sheets along the conveyor way through said stitching position, means for supporting said cooperating feed members in sheet gripping relation to said conveyor way in the various angularly adjusted positions of the latter, and means for intermittently actuating said feed members in synchronism with the stitcher head.

2. In a wire-stapling machine for attaching together a group of loose sheets, the combination of a stitcher head for stapling said sheets, a conveyor way for supporting said group whilst the latter are fed through a stitching position, said way including an elongated support panel having a dependent flange along a side edge adjacent said stitcher head, hinge means supporting said way for angular adjustment, about an axis parallel to said flanged edge and to the feed path of said group, between positions in which said support panel lies substantially horizontal and in which said panel together with said flange present an inverted V-section supporting surface with the apex located beneath the intended line of staples, at least one pair of co-operating superposed rollers positioned on the side of said staple line remote from the stitcher head for feeding said group along the conveyor way through said stitching position, the bottom roller of said pair being carried beneath said support panel for angular adjustment with the latter and having a small segment projecting through a slot in the latter, means attached to the stitcher head and supporting interchangeable bracket means for the top roller with its axis parallel to the bottom roller axis in the various angularly adjusted positions of said support panel, and means for driving both said rollers intermittently in synchronism with the stitcher head.

3. A wire-stapling machine as claimed in claim 2 in which a plurality of pairs of superposed co-operating feed rollers are positioned one after another in spaced series along said conveyor way at such a distance apart that a group will enter a following roller pair before it has completely left the preceding pair, the bottom rollers of said pairs each being driven and being carried beneath said support panel so that a small segment projects through a corresponding slot in the panel and the top rollers of the pairs being positioned with their axes parallel to the bottom rollers on the said bracket means removably attached to the stitcher head.

WILLIAM JAMES CUTHBERT.

References Cited in the file of this patent
UNITED STATES PATENTS

| Number | Name | Date |
|---|---|---|
| 341,799 | Donnell et al. | May 11, 1886 |
| 406,891 | Donnell | July 16, 1889 |
| 445,140 | Harper | Jan. 20, 1891 |
| 538,733 | Klein et al. | May 7, 1895 |
| 1,718,571 | Manny | June 25, 1929 |